(12) United States Patent  (10) Patent No.: US 6,431,157 B1
Marcil  (45) Date of Patent: Aug. 13, 2002

(54) INTERNAL COMBUSTION ENGINE (75) Inventor: Jean-Pierre Marcil, Quèbec (CA)

(73) Assignee: Volvo Car Corporation (SE)

( * ) Notice: Subject to any disclaimer, the term of this patent is extended or adjusted under 35 U.S.C. 154(b) by 0 days.

(21) Appl. No.: 09/683,283

(22) Filed: Dec. 7, 2001

Related U.S. Application Data

(63) Continuation of application No. PCT/SE00/01166, filed on Jun. 6, 2000.

(51) Int. Cl.$^7$ .......................... F02M 25/07; F02M 25/06
(52) U.S. Cl. .................. 123/568.11; 123/572; 123/573
(58) Field of Search ....................... 123/568.11, 568.12, 123/572, 573, 574, 41.86, 193.4, 193.6

(56) References Cited

U.S. PATENT DOCUMENTS

| | | | |
|---|---|---|---|
| 3,667,443 A | | 6/1972 | Currie et al. |
| 3,839,996 A | * | 10/1974 | DeBiasse ..................... 123/572 |
| 4,191,150 A | | 3/1980 | Siewert |
| 4,363,310 A | | 12/1982 | Thurston |
| 5,460,147 A | | 10/1995 | Bohl |
| 5,582,145 A | * | 12/1996 | Aizawa et al. ............... 123/572 |
| 5,647,337 A | * | 7/1997 | Johnson et al. ............. 123/572 |
| 6,065,458 A | * | 5/2000 | Ozeki ........................ 123/572 |
| 6,234,154 B1 | * | 5/2001 | Spix ........................... 123/572 |

FOREIGN PATENT DOCUMENTS

EP 0235481 A1 9/1987

\* cited by examiner

*Primary Examiner*—Willis R. Wolfe
(74) *Attorney, Agent, or Firm*—Kilpatrick Stockton LLP (57) ABSTRACT

The invention relates to an internal combustion engine, comprising a cylinder block with at least one cylinder barrel, a cylinder head with at least one inlet channel and exhaust channel with related inlet and exhaust valves to a combustion chamber situated above a piston moveable in the cylinder barrel and a crank case for lubricating oil situated below the piston, wherein the piston has at least two grooves situated at a distance from each other, each having a piston ring and a piston collection chamber contained between the rings. The engine has an expansion chamber commonly connected to each cylinder barrel via an individual evacuation port, said port opening out into the respective cylinder barrel, the expansion chamber forming a communicating connection between the cylinder barrel and the inlet channel via the evacuation port and an evacuation channel, said evacuation channel opening out into at least one inlet channel or inlet manifold. The evacuation port and the piston are so adapted to each other that the piston holds the evacuation port open in order to maintain the connection between the crank case and the inlet channel during the piston's movement from its top dead center to a position at a predetermined distance from the top dead center and thereafter breaks the connection of the evacuation port with the crank case during its continued movement down to bottom dead center, and that the collection chamber is connected to the evacuation port when the piston is near the bottom dead center.

15 Claims, 6 Drawing Sheets

INTERNAL COMBUSTION ENGINE

CROSS REFERENCE TO RELATED APPLICATIONS

The present application is a continuation of International Application No.

PCF/SE00/01166, filed Jun. 6, 2000, which claims priority to Swedish Application No. 990211 3-1, filed Jun. 7, 1999.

BACKGROUND OF INVENTION

Field of the Invention. The present invention relates to internal combustion engines. More specifically, the present invention relates to reducing or eliminating the combination of combustion gases and oil in the crankcase of an internal combustion engine.

Background Information. In an internal combustion engine, providing a piston ring seal between the pistons and the surrounding cylinder walls that completely seals off the combustion chambers from the crank case of the engine has yet to be done. A certain small quantity of combustion gases, or blow-by, flows past the piston ring down into the crankcase of the engine. In order to avoid a high overpressure in the crankcase at least partially due to the blow-by gases, the crankcase must be ventilated. The more effective the ventilation is, the lower the overpressure in the crank case and, therefore, the lower the engine pumping losses become. On the other hand, if there is a loss in crankcase pressure, oil consumption can increase due to oil vapor carried by the blow-by being evacuated by the positive crankcase ventilation system.

In modern engines, closed crankcase ventilation is used in order to minimize environmental effects. Normally, any blow-by gases and water vapor present are allowed to enter the crankcase where they are mixed vigorously with and become trapped within the oil droplets suspended in the crankcase. Afterwards, the oil droplets are led out from the crankcase via a hose to the inlet manifold of the engine before the throttle, where they are mixed with the intake air. In order to separate oil out of the oil mist unavoidably mixed with the blow-by gases, different types of filters and oil traps are used in the crankcase ventilation. Typically, crankcase ventilation systems separate oil from blow-by after they have been mixed together. Also, overpressure in the crankcase that increases with power demand is minimized by adding a pressure regulator.

Accordingly, there is a need for an internal combustion engine that reduces or eliminates overpressure in the crankcase that occurs with an increase in power demand. Further, there is a need for an internal combustion engine that minimizes or avoids the mixing of blow-by gases and oil.

SUMMARY OF INVENTION

The present invention includes a cylinder block with at least one cylinder barrel, a cylinder head with at least one inlet channel and exhaust channel with associated inlet and output valves for a combustion chamber. The combustion chamber is located above a piston moveable in the cylinder barrel. Below the piston is a crank case wherein lubricating oil is found. The piston is shaped with at least two peripheral grooves situated at a distance from each other, each having its own piston ring. A piston collection chamber is contained between the rings.

The present invention provides a means of avoiding the mixing of blow-by and oil. This is achieved by evacuating unburned blow-by mixture and combustion gases directly into an expansion chamber via an evacuation port in the cylinder wall, instead of letting them expand in the crankcase. Therefore, the gases do not mix intimately with the oil in the crankcase, facilitating the separation and oil trap operation. When expanding, the gases lose much of the flow rate energy that could otherwise allow them to carry and mix with oil droplets present in or near the evacuation port.

Even with a pressure regulator provided, engines are inclined to have a much higher pressure in the crankcase than in the combustion chamber during intake stroke. This pressure tends to press both the oil film on the cylinder wall and the oil mist in the crankcase past the oil scraper ring of the piston and into the combustion chamber of the engine. In order to prevent to as best possible this oil flow to the combustion chamber, the ring tension must be high for the oil scraper ring. The oil scraper ring is the component that causes the greatest internal friction in the engine.

The oil that penetrates into the combustion chamber of the engine does not just cause pollution in the engine exhaust gases, with consequential strain on the catalyzer. It also lowers the octane number of the fuel. In modern engines with knock sensors and automatic ignition advance, this leads to a retarding of the ignition with consequential increased fuel consumption. Further, engine oil consumption and the costs of replacing used oil are directly dependent on the amount of oil that penetrates into the combustion chamber due to the pressure difference between the crank case and the cylinder space above the piston.

Oil combustion also contributes to deposits in and around the piston rings. These deposits can interfere with the proper operation of the rings, and may eventually immobilize the rings, along with deteriorating their function.

The present invention provides an engine wherein the pressure difference between the engine crankcase and its air intake is maintained as low as possible. This pressure difference forces the lubricating oil past the piston rings and into the combustion chamber during the intake stroke of the engine. In other words, the pressure due to the pressure difference between the crankcase and the air intake during all operating conditions is lowered, thereby minimizing oil consumption, as well as pumping, windage and friction losses. Further, the present invention eliminates the need for a colder oil trap for condensing and recovering oil, and also prevents the system from freezing.

In the present invention, the cylinder block has been designed with an evacuation port for each cylinder. The channel opening into the cylinder barrel forms a communicating connection between the cylinder barrel and the intake channel, preferably in close proximity to an engine coolant passage. The evacuation channel outlet and the piston are adapted to each other such that the piston holds the evacuation channel open during movement of the piston from its top dead center to a position at a predetermined distance from top dead center (TDC), thereby maintaining the connection between the crankcase and the intake channel. Thereafter, the piston breaks the connection between the evacuation channel and the crankcase by its continued movement down to bottom dead center (BDC).

Also, the cylinder outlet port of the evacuation channel is adapted to provide communication with the piston collection chamber during the movement of the piston from TDC to a position at a predetermined distance from TDC. However, since the crankcase pressure in previously known engines is relatively high, and the volume and the rate of blow-by gases intended to flow into the evacuation channel is relatively high, the flow resistance in the evacuation channel becomes relatively high.

An oil trap is arranged in the evacuation channel to prevent oil particles in the blow-by gases flowing into the evacuation channel from reaching the intake channel and burning in the combustion chamber. However, since the flow rate of the blow-by gases in the evacuation channel is relatively high, it is difficult to prevent all oil particles from reaching the inlet channel.

The present invention provides an engine wherein the pressure pulses and the flow rate of blow-by gases in the evacuation channel is lower than in previously known engines, minimizing the flow velocity of the blow-by gases and preventing oil particles from reaching the inlet channel, while evacuating blow-by to the air inlet.

This is achieved according to the invention by providing the engine with an expansion chamber commonly connected to each cylinder via an individual evacuation port. The port opens out into the respective cylinder barrel. The expansion chamber forms a communicating connection between the cylinder barrel and the inlet channel via the evacuation port and an evacuation channel. The evacuation channel opens out into at least one inlet channel or inlet manifold, and the evacuation port and piston are so adapted to each other that the piston holds the evacuation port open, thereby maintaining the connection between the crankcase and the inlet channel during the piston's movement from its top dead center to a position at a predetermined distance from the top dead center. Thereafter, the piston breaks the connection of the evacuation port with the crankcase during its continued movement down to bottom dead center. The collection chamber is connected to the evacuation port when the piston is near the bottom dead center. This allows better pressure equalization between the inlet channel or manifold and the crankcase, while providing necessary communication and reducing the amount of oil splashes which could reach the port.

By providing a chamber having a large cross section between the evacuation port in the cylinder barrel and the inlet channel, blow-by gases coming from the evacuation port can expand, thereby reducing the pressure pulse magnitude and slowing down the flow of blow-by to a less turbulent state, resulting in more oil particles settling and being trapped. This expansion chamber is also provided with a return for permitting the oil to return to the crankcase from a less turbulent area of the chamber.

In a preferred embodiment, a cyclone tube is arranged in the expansion chamber in proximity to the evacuation ports. The cyclone tube, which can be double open ended, causes the blow-by gases to circulate so that oil particles in the blow-by are centrifugally forced into contact with a surface. Also, baffles can be arranged in the expansion chamber for increasing the contact area for the oil to cling to, and for reducing the pressure and speed of the circulating blow-by gas. By maintaining a negative pressure, water vapor will vaporize easily while oil droplets will cling to the cyclone surface due to its higher viscosity.

The piston is a conventional cylindrical piston that, according to the invention, can be provided with a shield on the side facing the opening of the evacuation port, which forms a screening-off towards the opening of the evacuation port thereby limiting the intrusion of oil splashes. The screen has a greater clearance towards the cylinder barrel wall than the piston cylinder so that the crank case, via the gap formed through the greater clearance, and the evacuation port are joined with the inlet channel, via the expansion chamber and the evacuation channel during a predetermined part of the path of movement of the piston.

Preferably, each piston has a collection chamber between the piston ring grooves for collecting unburned fuel-air mixture and combustion gases that pass the upper piston ring. The cylinder preferably has an evacuation port so orientated in relation to the collecting chamber that, after a predetermined movement of the piston from its top or bottom dead center portion, a communicating connection is established between the piston collection chamber and the inlet channel via the evacuation channel and the expansion chamber. In this way, unburned fuel-air mixture and combustion gases are prevented from reaching the crankcase. Instead they are ventilated out through the evacuation channel into the expansion chamber. They then flow to the inlet channel due to an overpressure that occurs in the collection chamber, while an underpressure occurs in the cylinder evacuation channel. Otherwise, unburned fuel-air mixture trapped under the first piston ring would flow back into the combustion chamber during the expansion stroke as soon as the cylinder pressure fell below the pressure of the mixture. However, this would occur too late for the mixture to be able to be burnt. To reduce pressure due to the volume of unburned fuel-air mixture and combustion gases in the collection chamber, the piston can be provided with a space, such as plurality of bores, communicating with the collection chambers In doing so, the total volume of the collection chamber is increased, leading to a reduction in pressure of the gases taken up in the collection chamber.

BRIEF DESCRIPTION OF DRAWINGS

The invention is described more closely with reference to the embodiments shown on the accompanying drawings, where.

DETAILED DESCRIPTION

Figure 1:
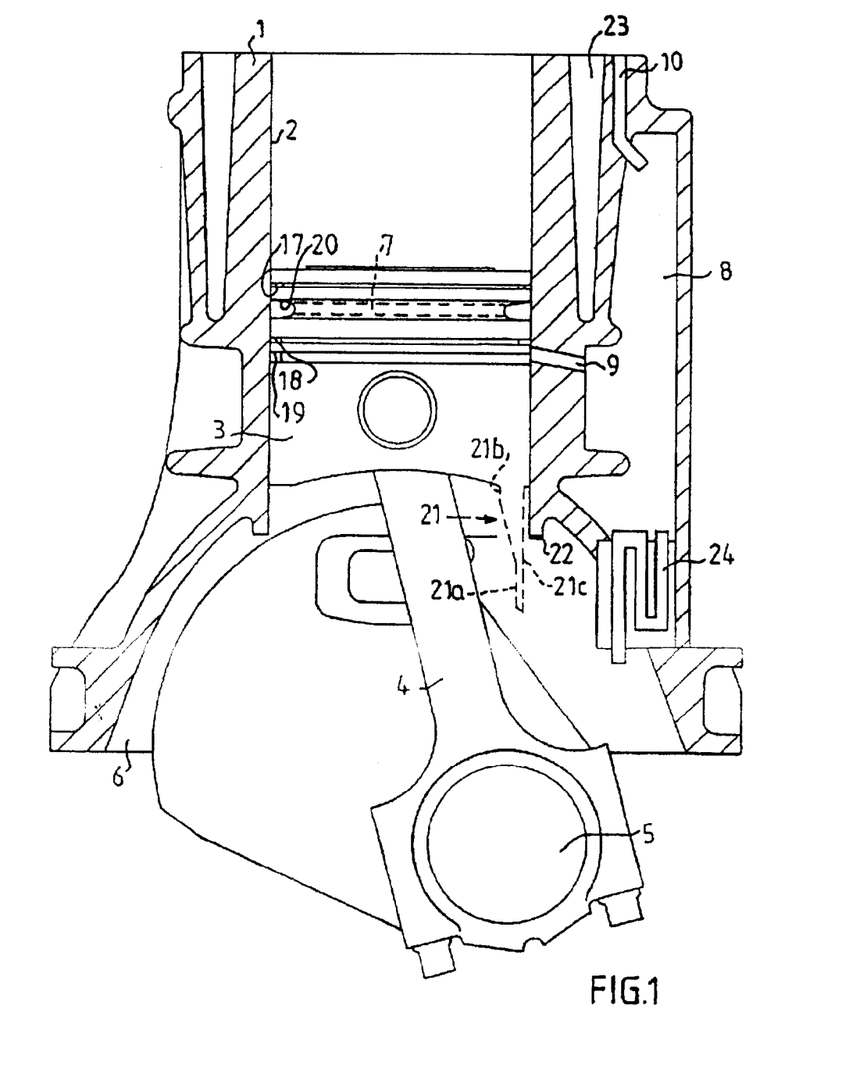
FIG. 1 illustrates a cross sectional view through a cylinder block of one embodiment of an engine according to the invention, FIG. 2 illustrate a cross sectional view through a cylinder head of one embodiment of an engine according to the invention.
Figure 2:
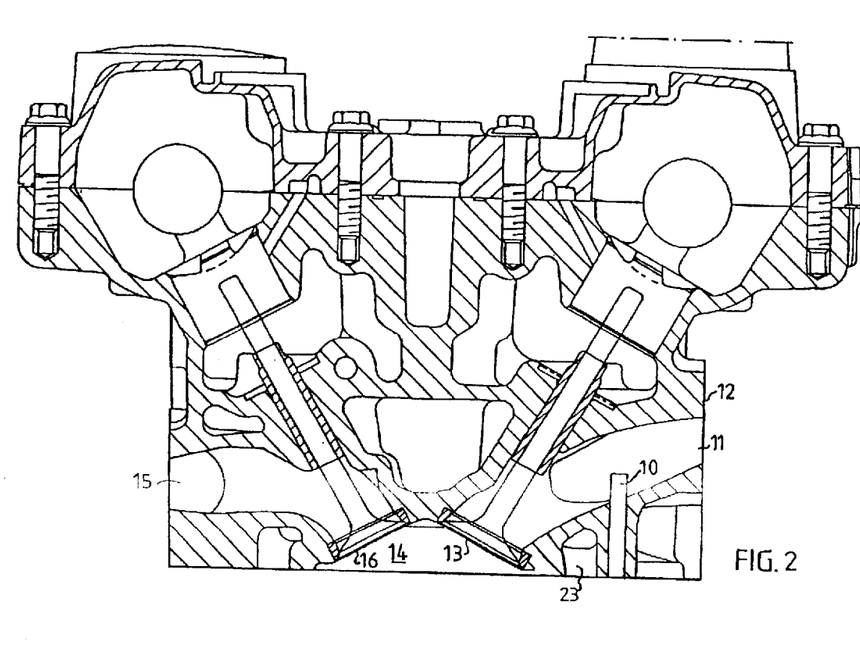

In FIG. 1, reference number 1 denotes a cylinder block and reference number 2 a cylinder barrel in which a piston 3 is displaceably mounted. The piston 3 is connected with a crank shaft 5 by a connecting rod 4 rotatably mounted in the crankcase 6 of the cylinder block 1. A lower frame bearing bridge and an oil pan, which together close the crank case, are omitted from FIG. 1. An evacuation port 9 is arranged in the cylinder block 1. The port 9 opens out into an expansion chamber 8 arranged on the outside of, preferably adjacent to, the engine block 1. Each port 9 can include one or more orifices (not shown) for providing sufficient flow area for the blow-by gases. An evacuation channel 10 opens out from the expansion chamber 8 into an inlet channel 11 in the cylinder head 12 of the engine (see FIG. 2). As seen from FIG. 2, the evacuation channel opens out into the inlet channel 11 relatively close to the inlet valve 13 in the combustion chamber 14. An exhaust channel 15 with an exhaust valve 16 also opens out into the combustion chamber 14.

Figure 3:
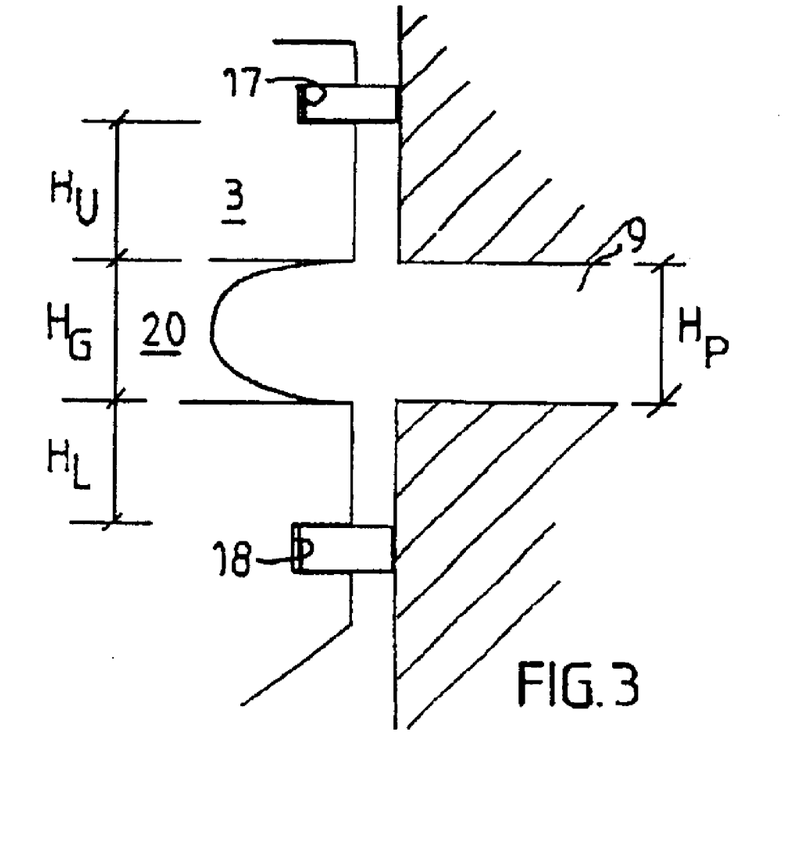
FIG. 3 illustrates a cross sectional detail view of piston ring grooves and a collection chamber of a piston of one embodiment of an engine according to the invention.

The piston 3 preferably has a first and second piston ring groove 17, 18, respectively, for a first and second compression ring (not shown), and a third piston ring groove 19 for an oil scraper or control ring. A collection chamber 20, in the form of a groove, the width and depth of which may be considerably greater than the width and depth of the piston ring groove, is found in the part of the piston between the piston ring grooves 17, 18. This is illustrated in FIG. 3.

In order to optimize the time-area (the period in which the port 9 communicates with the collection chamber 20 and the cross-section of the evacuation port 9) and reduce the piston deck height (the distance between the top of the piston and the wrist pin axis. 3a), the height $H_P$ of the port 9 should be smaller than, or preferably equal to, the height $H_G$ of the collection chamber groove 20. This will allow maximum flow capacity with minimum piston deck height. At the same time, the distance $H_U$ between the lower edge of the first, upper compression ring 17 and the upper edge of the collection chamber groove 20 must be equal or larger than the height $H_p$ of the port 9. This will maximize the duration and the timing of the gas flow between the collection chamber 20 and the port, while minimizing the deck height, as the time the piston spends near the BDC is relatively long.

Similarly, the distance $H_L$ between the upper edge of the second, lower compression ring 18 and the lower edge of the collection chamber groove 20, must also be equal to or larger than the height $H_P$ of the port 9. This is necessary in order to prevent blow-by from entering the crankcase. This achieved by avoiding communication between the collection chamber 20 and the crankcase 6 when the port 9 is overlapping the second compression ring 18.

The height $H_G$ of the collection chamber groove 20 must be equal to or smaller than either of the heights $H_U$ or $H_L$ between the upper or lower compression rings 17,18 and the upper or lower edges of the collection chamber groove 20, respectively.

Also, the lower edge of the first compression ring 17 must always be level with or above the upper edge of the port 9 at BDC in order to prevent pressurized gas flow from the combustion chamber into the port 9, through the expansion chamber 8 and into the crankcase 6.

In a preferred embodiment, the heights $H_G$, $H_U$ and $H_L$ are equal, or near equal within the parameters stated above.

In a further embodiment the piston 3 can be designed with a shield 21 on the side which faces the opening of the evacuation port 9. The axial extent of the shield 21 is approximately the same as the length of the piston 3 from the lower edge of the oil scraper groove to the lower edge of the piston. The smallest width of the shield 21 at the lower part 21a is approximately four times the diameter of the evacuation port 9. The width of the lower part may be chosen up to the greatest width of the upper part 21b, which may be up to approximately one sixth of the circumference of the piston. As seen in FIG. 1, the relationship between the shield 21 and the piston is such that a gap 22 is formed between the wall of the cylinder barrel 2 and the shield wall 21c. The width of the gap 22 should preferably be about a fourth of the diameter of the opening of the evacuation port 9. However, the sizes should be chosen so that the 22 along with a stepped shield 21 are dimensioned so as to give the crank case vapor a constricted passage into the evacuation port 9, as well as limit oil splashes from reaching the evacuation port 9. When forming the stepped shield 21, there will be an upper portion with a small clearance between the shield surface and the cylinder wall and a lower portion with a larger clearance.

The piston 3 with the shield 21 functions as a moving valve element that connects the crank case 6 with the expansion chamber 8, and thereby the inlet channel 11, from the top dead center of the piston 3 to about half of an effective piston stroke. In this way, the pressure difference between the crank case 6 and the inlet channel 11 is reduced. Closing the evacuation port 9 reduces the inner cyclic pressure pulse effect in the crank case 6 that would otherwise lead to an increased oil transfer due to the carry-over of suspended oil to the expansion chamber 8. The relatively low pressure in the crank case 6 that occurs with a low and medium throttle opening also leads to reducing the negative effects of these inner pressure pulses. This makes it possible to dimension the engine with a small crank case volume, even under heavy load.

The expansion chamber 8, evacuation port 9 and evacuation channel 10 are pre-warmed continuously by the cooling fluid in the adjacent cooling jacket 23, eliminating the requirement for expensive heated pipes or tubes. This reduces the costs and risk for freezing at extremely low temperatures.

Oil from the oil scraper ring is prevented from being taken into the inlet channel 11 via the evacuation port 9 through substantially the same underpressure existing in the crank case under the piston as in the inlet channel 11. As a result, the tension in the oil scraper ring can be reduced, reducing friction between the piston and the cylinder. Oil in the oil mist that reaches the evacuation port 9 is separated out by means of the expansion chamber 8, as will be described in more detail according to a second embodiment illustrated in FIG. 4.

Blow-by gases that pass the first compression ring in the groove 17 during the early expansion stroke of the piston 3 are retained in the collection chamber formed by the collection chamber 20 and the bore 7. Once the piston 3 has completed the main part of the expansion stroke, the collection chamber 20 and the bore are connected with the evacuation port 9. Blow-by gases under pressure can now expand and be evacuated to the inlet channel 11 via the evacuation port 9, expansion chamber 6 and evacuation channel 10. No further air or gas is used to push out the blow-by gas. However, the gas and some oil is evacuated through its own pressure.

When the piston 3 begins moving upwards during the exhaust stroke after having passed BDC, any remaining gas is evacuated. This is possible since the collection chamber 20 is still connected with the evacuation port 9 at the piston's 3 initial movement upwards. Should blow-by gas still remain in the collection chamber 20 during the final part of the exhaust stroke and the main part of the inlet stroke, this gas can be evacuated to the inlet channel 11 when the collection chamber 20 and port 9 are again joined together.

Thus, during all working strokes the collection chamber 20 and the bore at times are connected with the evacuation port 9, ensuring that the collection chamber 20 and bore 7 are properly emptied of vapor at the beginning of each expansion stroke. This is important for keeping the collection chamber 20 clean and free of residue.

The part of the hydrocarbon ("HC") emission which must be neutralized in a conventional engine's catalyzer is created from the unburned fuel-air mixture that is pressed past the first compression ring during the compression stroke and trapped between the compression rings. This mixture normally flows back to the combustion chamber 14 as reverse blow-by when the pressure in the combustion chamber 14 during the expansion stroke is less than the pressure in the mixture between the rings. However, this fuel-air mixture can accumulate and return to the combustion chamber 14 too late for burning and for contributing to the output of the engine. With the help of the evacuation port 9 the unburned fuel-air mixture can be evacuated from the collection chamber 20 before the pressure in the combustion chamber becomes so low that the mixture can flow past the first piston ring and back into the combustion chamber 14. The mixture can then be burned in the next power stroke, instead of being pulled out with the exhaust or drawn into the crankcase.

Referring to the embodiment illustrated in FIG. 1, the expansion chamber 8 in its lowermost portion is provided with a vapor separator 24 that connects the expansion chamber 8 with the crank case 6. The volume of the expansion chamber 8 allows the blow-by gases to expand and slow down to a calmer or less turbulent condition in the expansion chamber 8, thereby allowing oil to be trapped. Oil particles in the expansion chamber 8 flow by gravity down to the lowermost portion. When the oil reaches the vapor separator 24, the oil returns to the crank case 6. The vapor separator 24 is situated in a less turbulent area of the expansion chamber 8. This will make it easy for the oil to pass the vapor separator 24 without being disturbed by the blow-by gases in the expansion chamber 8.

The evacuation channel 10 is preferably arranged in the uppermost portion of the expansion chamber 8. In this way the blow-by gases have to pass a relatively long distance through an area heated by the engine in the expansion chamber 8 before they reach the evacuation channel 10, so that the blow-by gases are allowed to expand and slow down as mentioned above. Because the gases flow through a heated area, the water vapor in the blow-by is prevented from freezing.

Figure 4:
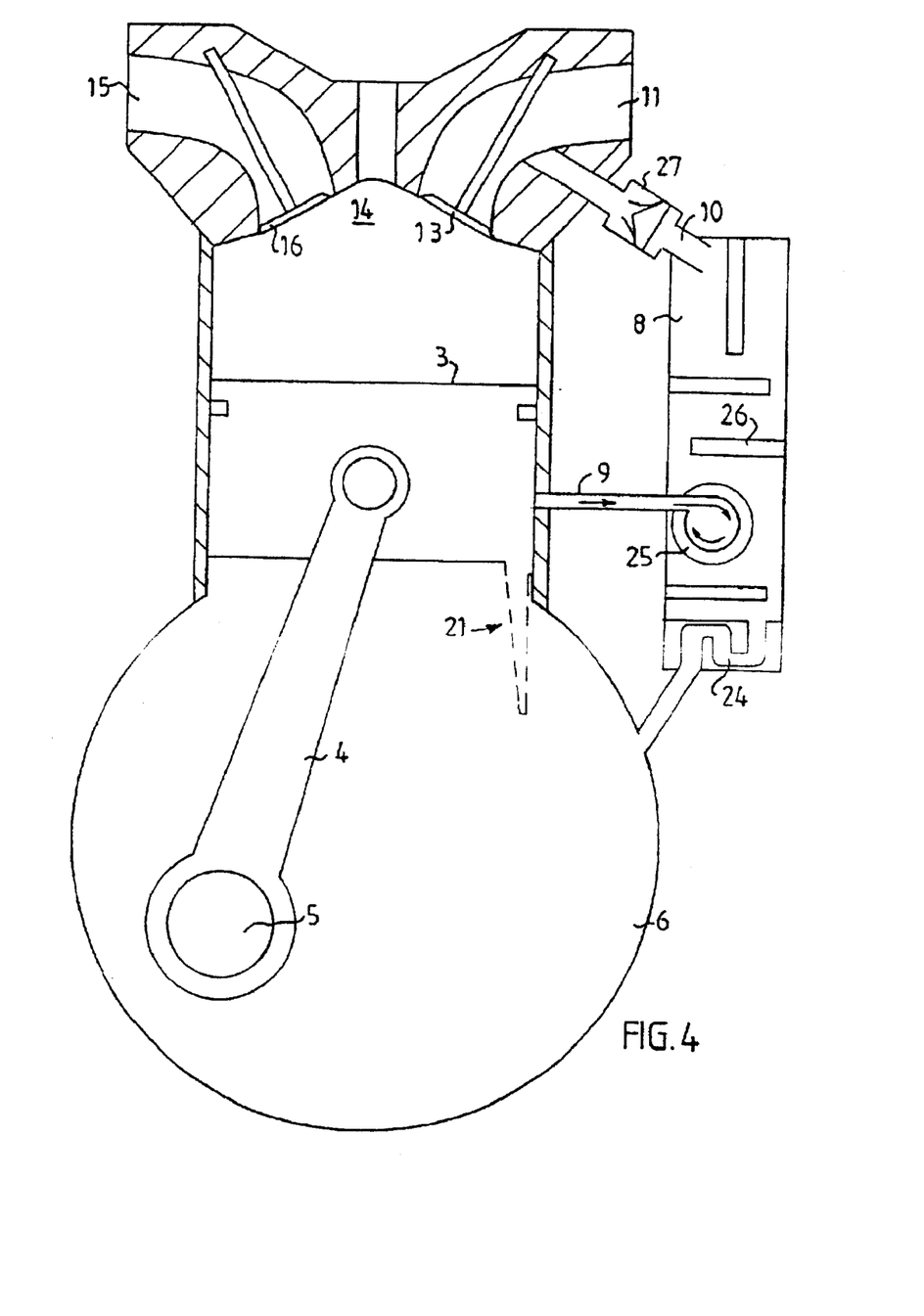
FIG. 4 illustrates a cross sectional schematic representation of another embodiment of an engine according to the invention.

In another embodiment illustrated in FIG. 4, a cyclone tube 25 is arranged into the expansion chamber 8. The cyclone tube 25 makes the blow-by gases circulate, causing oil particles in the blow-by gases to cling to surfaces in the cyclone due to the centrifugal force of the gas. Baffles can be arranged in the expansion chamber 8 in order to further increase the contact surface in the chamber 8, as well as reduce the speed of the circulating oil droplets in the blow-by gases.

A one-way check valve 27, such as a reed valve, is arranged in the evacuation channel 10. The check valve 27 prevents a pressure build-up in the air intake from propagating in the expansion chamber during sudden acceleration or transient throttle application. In such cases, the check valve 27 remains closed until the pressure in the expansion chamber 8 exceeds the pressure in the air intake. By doing so, a sudden loss of underpressure in the expansion chamber 8 is avoided. Although the pressure in the chamber will begin to rise under such conditions, the delay is sufficient enough to ensure proper operation of the system until the next opening of the check valve 27.

Figure 5:
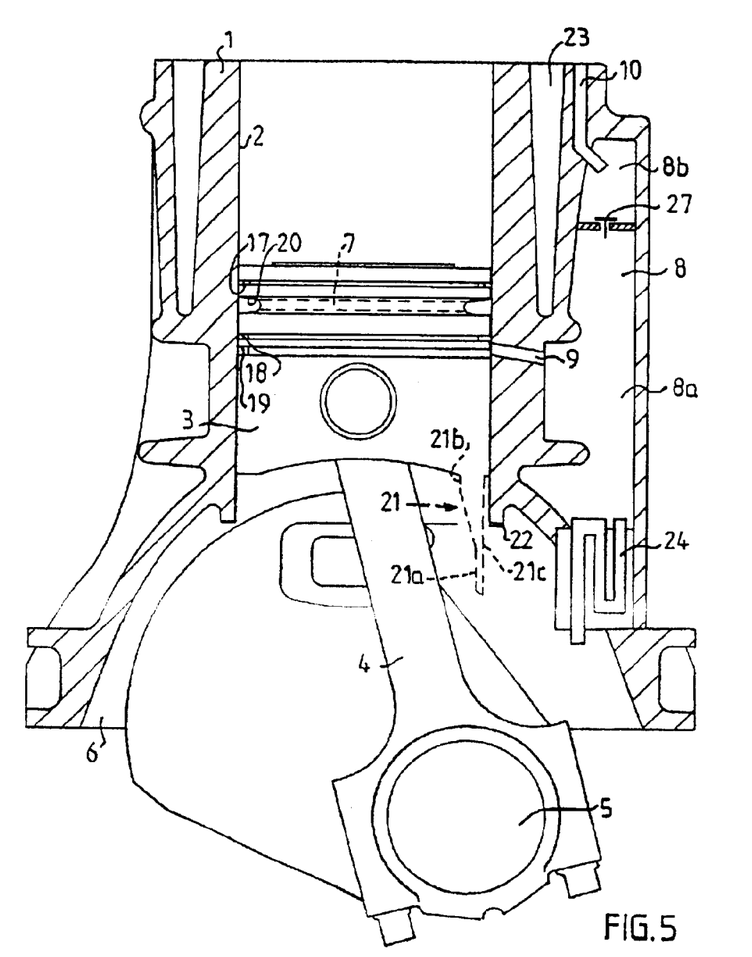
FIG. 5 illustrates a cross sectional schematic representation of a third embodiment of an engine according to the invention.

Alternatively, in a third embodiment shown in FIG. 5, the expansion chamber could be divided into a primary 8a and a secondary 8b chamber. The chambers 8a, 8b can be separated by an additional baffle, or by placing the check valve 27 between the chambers. Preferably, the secondary chamber 8b is smaller than the primary chamber 8a and is in direct communication with the evacuation channel 10.

Since the pressure and flow rate of the blow-by gases in the expansion chamber 8 is lower than in the evacuation channel mentioned in the introduction, the flow resistance of the blow-by gases is minimized. The low flow rate of the blow-by gases reduces the amount of oil particles reaching the inlet channel 11. Also, the fact that the engine is operated with crankcase underpressure, water vapor exiting the collection chamber 20 remains in vapor form and is easily evacuated.

In the embodiments above, only one expansion chamber 8 on the outside of the cylinder block 1 is disclosed. However, it is possible to arrange expansion chambers 8 on either side or several on one side of the engine, so that if two expansion chambers are disposed directly on the engine, then at least two expansion chambers 8 are disposed directly on the engine and so that at least two evacuation ports 9 are arranged in each cylinder barrel 2, each port 9 leading to its respective expansion chamber 8. Thus, several evacuation ports 9 can be arranged in each cylinder barrel 2.

Figure 6:
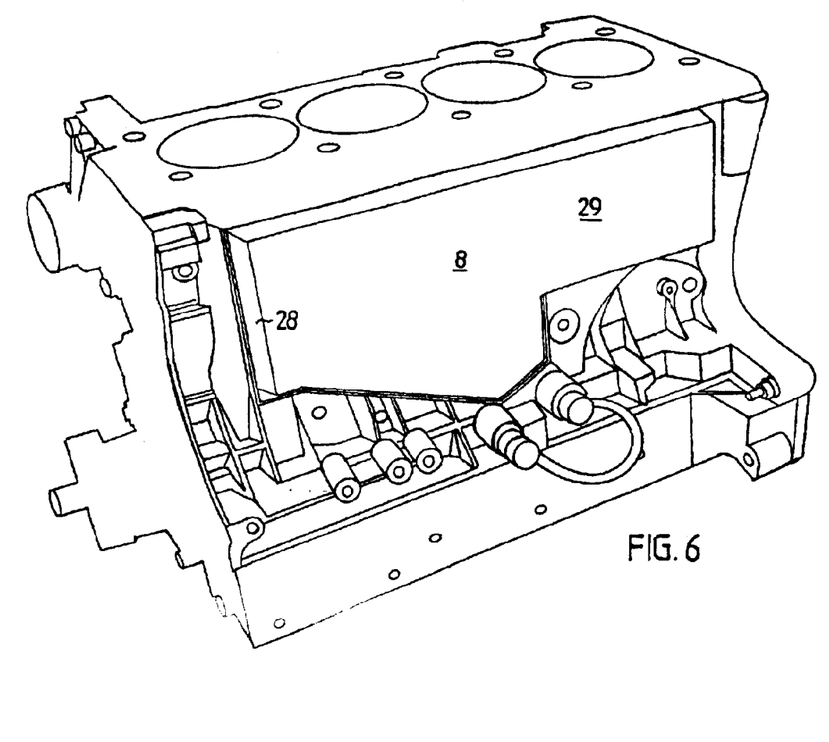
FIG. 6 illustrates a perspective view of a cylinder block of one embodiment of an engine according to the invention.

In FIG. 6, a perspective view of one embodiment of an engine according to the invention is shown. The expansion chamber 8 is arranged on the outside of the cylinder block 1 so that the outside of the cylinder block 1 constitutes an inner wall of the space defining the expansion chamber 8. Preferably, the side walls 28 defining the space which constitutes the expansion chamber 8 are integral with the cylinder block 1.

A plate or cover 29 is arranged hermetically on the side walls 28 of the expansion chamber 8. The cover 29 can be provided with a heat insulating layer.

The expansion chamber 8 is commonly connected to each cylinder barrel 2 via an evacuation port 9 arranged in each cylinder barrel 2. However, the expansion chamber 8 can be divided in compartments, for example, one for each cylinder barrel 2.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. An internal combustion engine comprising:
   a cylinder block having at least one cylinder barrel,
   a piston moveable in the cylinder barrel,
   wherein the piston is further comprised of at least two peripheral grooves situated at a distance from each other, each having a piston ring, and a piston collection chamber contained between the rings,
   a combustion chamber situated above the piston,
   a cylinder head having at least one inlet channel and exhaust channel with related inlet and exhaust valves to the combustion chamber,
   a crank case for lubricating oil situated below the piston,
   an expansion chamber in the engine,
   at least one evacuation port for connecting the expansion chamber to at least one cylinder barrel, the port opening out into the cylinder barrel,
   an evacuation channel opening out into at least one inlet channel or inlet manifold,
   wherein the expansion chamber forms a communicating connection between the cylinder barrel and the inlet channel via the evacuation port and evacuation channel, and wherein the piston holds the evacuation port open in order to maintain the connection between the crank case and the inlet channel during the piston's movement from its top dead center to a position at a predetermined distance from the top dead center and thereafter breaks the connection of the evacuation port with the crank case during its continued movement down to bottom dead center, and wherein the collection chamber is connected to the evacuation port when the piston is near the bottom dead center.

2. The internal combustion engine according to claim 1 further comprising a cyclone tube arranged into the expansion chamber for causing the blow-by gases to circulate, thereby centrifugally forcing oil particles in the blow-by gases into contact with a surface of the cyclone tube so as to separate the oil from the gas.

3. The internal combustion engine according to claim 1, further comprising:

at least two expansion chambers arranged at the engine, and at least two evacuation ports arranged in each cylinder barrel, each port leading to respective expansion chamber.

4. The internal combustion engine according to claim 1, wherein the at least one evacuation port further comprises at least two orifices in order to provide sufficient flow area for the blow-by gases.

5. The internal combustion engine according to claim 1, wherein the expansion chamber in its lowermost portion further comprises a vapor separator for connecting the expansion chamber with the crank case.

6. The internal combustion engine according to claim 1, further comprising a check valve arranged in the evacuation channel for preventing the mixture of air and fuel in the inlet channel from entering into the expansion chamber.

7. The internal combustion engine according to claim 1, wherein the cylinder block further comprises one or more cooling jackets for cooling fluid, and wherein the expansion chamber is situated adjacent to a wall of at least one cooling jacket.

8. The internal combustion engine according to claim 1, wherein the expansion chamber is arranged on the outside of the cylinder block with the outside of the cylinder block comprises an inner wall of a space defining the expansion chamber.

9. The internal combustion engine according to claim 8, wherein the expansion chamber further comprises a primary and a secondary chamber.

10. The internal combustion engine according to claim 9, wherein the expansion chamber further comprises a baffle for separating the primary and secondary chamber, the baffle being provided with an aperture for connection between the chambers.

11. The internal combustion engine according to claim 10, further comprising a check valve arranged in the aperture.

12. The internal combustion engine according to claim 1, wherein the piston further comprises:

a collecting chamber between the piston ring grooves for collecting unburned fuel-air mixture and combustion gases that pass the upper piston ring, and a communicating connection between the collecting chamber and the inlet channel via the evacuation port, expansion chamber and evacuation channel that is created due to the orientation of the evacuation port in relation to the collecting chamber after a predetermined movement of the piston from its top and bottom dead center.

13. The internal combustion engine according to claim 12, wherein the collecting chamber further comprises a peripheral groove between the piston ring grooves.

14. The internal combustion engine according to claim 13, wherein the peripheral groove is wider and deeper than the piston ring grooves.

15. The internal combustion engine according to claim 14, wherein the width of the peripheral groove is substantially equal to the height of the evacuation port.

\* \* \* \* \*